US012538347B2

(12) United States Patent
Li (10) Patent No.: US 12,538,347 B2
(45) Date of Patent: Jan. 27, 2026

(54) METHOD AND APPARATUS FOR CONFIGURING RS SET, AND DEVICE AND STORAGE MEDIUM THEREOF

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 705 days.

(21) Appl. No.: 17/275,188

(22) PCT Filed: Sep. 13, 2018

(86) PCT No.: PCT/CN2018/105559
§ 371 (c)(1),
(2) Date: Mar. 10, 2021

(87) PCT Pub. No.: WO2020/051845
PCT Pub. Date: Mar. 19, 2020

(65) Prior Publication Data
US 2021/0329652 A1    Oct. 21, 2021

(51) Int. Cl.
*H04W 72/563* (2023.01)
*H04B 7/06* (2006.01)
*H04L 5/00* (2006.01)
*H04W 36/30* (2009.01)
*H04W 72/542* (2023.01)

(52) U.S. Cl.
CPC ......... *H04W 72/563* (2023.01); *H04L 5/0048* (2013.01); *H04W 36/305* (2018.08); *H04W 72/542* (2023.01)

(58) Field of Classification Search
CPC ............. H04W 72/563; H04W 72/542; H04W 36/305; H04L 5/0048

USPC ........................................................ 370/329
See application file for complete search history.

(56) References Cited

U.S. PATENT DOCUMENTS

| 2009/0247156 | A1 | 10/2009 | Sampath et al. |
| 2014/0308905 | A1 | 10/2014 | Miao et al. |
| 2016/0050596 | A1 | 2/2016 | Shin et al. |
| 2016/0353512 | A1* | 12/2016 | Lu ..................... H04W 36/0085 |
| 2018/0062811 | A1 | 3/2018 | Akkarakaran et al. |

(Continued)

FOREIGN PATENT DOCUMENTS

| CN | 106470096 A | 3/2017 |
| CN | 107889130 A | 4/2018 |

(Continued)

OTHER PUBLICATIONS

R1-1719769 (Year: 2017).*
R1-1720117 (Year: 2017).*
International search report of PCT application No. PCT/CN2018/105559 issued on Jun. 12, 2019.
VIVO, "Remaining Details on Beam Measurement and Reporting"; 3GPP TSG RAN WG1 Meeting #91, R1-1719769, Dec. 1, 2017 (Dec. 1, 2017), sections 1-3.

(Continued)

*Primary Examiner* — Intekhaab A Siddiquee
(74) *Attorney, Agent, or Firm* — Syncoda LLC; Feng Ma (57) ABSTRACT

A method for configuring a reference signal (RS) set includes: acquiring, by a terminal, a channel measurement result; sending, by the terminal a measurement report to an access network device in response to the channel measurement result meeting a preset condition; updating, by the access network device, a target RS set based on the measurement report; and sending, by the access network device, RS set update information to the terminal.

18 Claims, 3 Drawing Sheets

(56) References Cited

U.S. PATENT DOCUMENTS

2018/0132125 A1* 5/2018 Li .................... H04W 24/10
2019/0090143 A1* 3/2019 Luo .................. H04B 7/0617

FOREIGN PATENT DOCUMENTS

| CN | 108023722 A | | 5/2018 | |
|----|----|----|----|----|
| CN | 108112030 A | * | 6/2018 | ............ H04W 24/04 |
| CN | 108206714 A | | 6/2018 | |
| CN | 108260214 A | | 7/2018 | |
| WO | WO-2018059487 A1 | * | 4/2018 | ........... H04B 7/0695 |
| WO | 2018083253 A1 | | 5/2018 | |
| WO | 2018098969 A1 | | 6/2018 | |
| WO | WO-2019226238 A1 | * | 11/2019 | ............. H04B 17/24 |

OTHER PUBLICATIONS

Extended European search report of European application No. 18933251.3 issued on Apr. 8, 2022.
China National Intellectual Property Administration, First office action of Chinese application No. 202110256961.9 Issued on Jun. 29, 2022, which is foreign counterpart application of this US application.
Channel state information framework, 3GPP TS 38.214 V15.2.0, Jun. 30, 2018, section 5.2.1.
Ericsson, "Feature lead summary 3 on beam management", 3GPP TSG RAN WG1 Meeting #92, R1-1803417, Mar. 2, 2018, section 3.1.
Extended European search report of European application No. 24167474.6 issued on Jul. 2, 2024.

* cited by examiner

METHOD AND APPARATUS FOR CONFIGURING RS SET, AND DEVICE AND STORAGE MEDIUM THEREOF

CROSS-REFERENCE TO RELATED APPLICATION

This is a US national stage application of International Application No. PCT/CN2018/105559 filed on Sep. 13, 2018, the disclosure of which is hereby incorporated by reference in its entirety.

TECHNICAL FIELD

Embodiments of the present disclosure relate to the field communication technologies, and in particular, relate to a method and apparatus for configuring a reference signal (RS) set, and a device and a storage medium thereof.

BACKGROUND

In a 5G New Radio (NR) system, an access network device and a terminal may send and receive information using a beam. For example, the access network device may send downlink control information of a physical downlink control channel (PDCCH) to the terminal by means of a beam.

When the terminal moves or an antenna direction of the access network device changes, the beam for receiving the downlink control information, configured by the access network device for the terminal, may be subject to a beam failure. Currently, a standard definition of an RS set configured to detect the beam failure is made. Upon detecting that channel measurement parameters corresponding to all RSs in an RS set are less than a first threshold value, the terminal determines that a beam failure occurs.

At this time, the terminal may detect, according to the RS set configured by the access network device for determining a candidate beam, whether an RS with a layer-1 reference signal received power (L1-RSRP) being greater than a second threshold value is present in the RS set used for determining the candidate beam. If such an RS is present, the terminal sends a random access preamble corresponding to the RS on a random access time-frequency resource corresponding to the RS. In this way, the access network device is informed invisibly that a beam failure occurs to the terminal, and the candidate beam is found. Subsequently, the terminal detects a response to a beam failure request, sent by the access network device, and waits for a beam failure recovery.

When the channel measurement parameters corresponding to the RSs included in both the RS set configured to detect the beam failure and the RS set configured to determine the candidate beam are relatively poor, the probability of the beam failure increases, and the success rate of the beam failure recovery is reduced.

SUMMARY

Embodiments of the present disclosure provide a method and apparatus for configuring an RS set, and a device and a storage medium thereof. The technical solutions are described as below.

According to a first aspect of the embodiments of the present disclosure, a method for configuring an RS set is provided. The method includes: acquiring, by a terminal, a channel measurement result, wherein the channel measurement result includes channel measurement parameters corresponding to n RSs in a target RS set and channel measurement parameters corresponding to m other RSs outside the target RS set, both n and m being positive integers; sending, by the terminal, a measurement report to an access network device in response to the channel measurement result meeting a preset condition, wherein the measurement report is configured to trigger the access network device to update the target RS set; and receiving, by the terminal, RS set update information from the access network device, wherein the RS set update information is configured to indicate RSs in the updated target RS set.

Optionally, the target RS set is a set of RSs configured to detect a beam failure or a radio link failure, or the target RS set is a set of RSs configured to determine a candidate beam during a beam failure recovery.

Optionally, the measurement report includes identification information of k RSs and indication information of the channel measurement parameters corresponding to the k RSs, k being an integer greater than 1; wherein the k RSs comprise the n RSs and at least one other RS, with the channel measurement parameter being greater than the channel measurement parameter corresponding to a target RS, in the m other RSs, the target RS being an RS with a minimum channel measurement parameter in the n RSs.

Optionally, in the k RSs, the indication information of the channel measurement parameter corresponding to an optimal RS is represented by a bits, the optimal RS being an RS with a maximum channel measurement parameter in the k RSs, a being a positive integer; in the k RSs, the indication information of the channel measurement parameter corresponding to each remaining RS other than the optimal RS is represented by b bits, b being a positive integer; and the indication information of the channel measurement parameter corresponding to an $i^{th}$ remaining RS is intended to indicate a difference between the channel measurement parameter corresponding to the $i^{th}$ remaining RS and the channel measurement parameter corresponding to the optimal RS, or to indicate that the channel measurement parameter corresponding to the $i^{th}$ remaining RS is less than a present threshold, i being a positive integer.

Optionally, the preset condition includes any one of: the first W RSs of all the RSs included in the channel measurement result, ranked based on the channel measurement parameters in a descending order, being different from channel measurement results previously acquired, w being a positive integer; or the channel measurement parameter corresponding to at least one RS in the target RS set being less than a first threshold value; or a sum of the channel measurement parameter corresponding to at least one RS in the target RS set and a preset offset being less than a maximum value of the channel measurement parameters corresponding to the m other RSs; or the channel measurement parameter corresponding to at least one other RS in the m other RSs being greater than a second threshold value; or the channel measurement parameter corresponding to at least one RS in the target RS set being less than a third threshold value, and the channel measurement parameter corresponding to at least one other RS in the m other RSs being greater than a fourth threshold value.

Optionally, the method further includes: receiving, by the terminal, configuration information from the access network device, wherein the configuration information includes at least one of: measurement object configuration information, measurement parameter configuration information, report trigger configuration information, and report content configuration information; wherein the measurement object configuration information is intended to indicate an RS that needs to acquire the channel measurement parameter, the measurement parameter configuration information is intended to indicate a type of the channel measurement parameter, the report trigger configuration information is intended to indicate the preset condition that needs to be met when the measurement report is sent to the access network device, and the report content configuration information is intended to indicate content that needs to be contained when the measurement report is sent to the access network device.

According to a second aspect of the embodiments of the present disclosure, a method for configuring an RS set is provided. The method includes: receiving, by an access network device, a measurement report, wherein the measurement report is sent by a terminal in response to a channel measurement result meeting a preset condition, the channel measurement result including channel measurement parameters corresponding to n RSs in a target RS set and channel measurement parameters corresponding to m other RSs outside the target RS set, both n and m being positive integers; updating, by the access network device, the target RS set based on the measurement report; and sending, by the access network device, RS set update information to the terminal, wherein the RS set update information is configured to indicate RSs in the updated target RS set.

Optionally, the target RS set is a set of RSs configured to detect a beam failure or a radio link failure, or the target RS set is a set of RSs configured to determine a candidate beam during a beam failure recovery.

Optionally, the measurement report includes identification information of k RSs and indication information of the channel measurement parameters corresponding to the k RSs, k being an integer greater than 1; wherein the k RSs include the n RSs and at least one other RS, with the channel measurement parameter being greater than the channel measurement parameter corresponding to a target RS, in the m other RSs, the target RS being an RS with a minimum channel measurement parameter in the n RSs.

Optionally, updating, by the access network device, the target RS set based on the measurement report includes: adding, by the access network device, at least one RS to the target RS set, and/or deleting at least one RS from the target RS set; wherein the channel measurement parameter corresponding to the RS added to the target RS set is greater than the channel measurement parameter corresponding to the RS deleted from the target RS set.

Optionally, the method further includes: sending, by the access network device, configuration information to the terminal, and the configuration information includes at least one of the followings: measurement object configuration information, measurement parameter configuration information, report trigger configuration information, and report content configuration information; wherein the measurement object configuration information is intended to indicate an RS that needs to acquire the channel measurement parameter, the measurement parameter configuration information is intended to indicate a type of the channel measurement parameter, the report trigger configuration information is intended to indicate the preset condition that needs to be met when the measurement report is sent to the access network device, and the report content configuration information is intended to indicate content that needs to be contained when the measurement report is sent to the access network device.

According to a third aspect of the embodiments of the present disclosure, an apparatus for configuring an RS set is provided. The apparatus is applicable to a terminal and includes: an acquiring module, configured to acquire a channel measurement result, wherein the channel measurement result includes channel measurement parameters corresponding to n RSs in a target RS set and channel measurement parameters corresponding to m other RSs outside the target RS set, both n and m being positive integers; a sending module, configured to send a measurement report to an access network device in response to the channel measurement result meeting a preset condition, wherein the measurement report is intended to trigger the access network device to update the target RS set; and a receiving module, configured to receive RS set update information from the access network device, wherein the RS set update information is intended to indicate RSs in the updated target RS set.

Optionally, the target RS set is a set of RSs configured to detect a beam failure or a radio link failure, or the target RS set is a set of RSs configured to determine a candidate beam during a beam failure recovery.

Optionally, the measurement report includes identification information of k RSs and indication information of the channel measurement parameters corresponding to the k RSs, k being an integer greater than 1; wherein the k RSs include the n RSs and at least one other RS, with the channel measurement parameter being greater than the channel measurement parameter corresponding to a target RS, in the m other RSs, the target RS being an RS with a minimum channel measurement parameter in the n RSs.

Optionally, in the k RSs, the indication information of the channel measurement parameter corresponding to an optimal RS is represented by a bits, the optimal RS being an RS with a maximum channel measurement parameter in the k RSs, a being a positive integer; in the k RSs, the indication information of the channel measurement parameter corresponding to each remaining RS other than the optimal RS is represented by b bits, b being a positive integer; and the indication information of the channel measurement parameter corresponding to an $i^{th}$ remaining RS is intended to indicate a difference between the channel measurement parameter corresponding to the $i^{th}$ remaining RS and the channel measurement parameter corresponding to the optimal RS, or to indicate that the channel measurement parameter corresponding to the $i^{th}$ remaining RS is less than a present threshold, i being a positive integer.

Optionally, the preset condition includes any one of: the first W RSs of all the RSs included in the channel measurement result, ranked based on the channel measurement parameters in a descending order, being different from channel measurement results previously acquired channel measurement result, w being a positive integer; or the channel measurement parameter corresponding to at least one RS in the target RS set being less than a first threshold value; or a sum of the channel measurement parameter corresponding to at least one RS in the target RS set and a preset offset being less than a maximum value of the channel measurement parameters corresponding to the m other RSs; or the channel measurement parameter corresponding to at least one other RS in the m other RSs being greater than a second threshold value; or the channel measurement parameter corresponding to at least one RS in the target RS set being less than a third threshold value, and the channel measurement parameter corresponding to at least one other RS in the m other RSs being greater than a fourth threshold value.

Optionally, the receiving module is further configured to receive configuration information from the access network device, and the configuration information includes at least one of the followings: measurement object configuration information, measurement parameter configuration information, report trigger configuration information and report content configuration information; wherein the measurement object configuration information is intended to indicate an RS that needs to acquire the channel measurement parameter, the measurement parameter configuration information is intended to indicate a type of the channel measurement parameter, the report trigger configuration information is intended to indicate the preset condition that needs to be met when the measurement report is sent to the access network device, and the report content configuration information is intended to indicate content that needs to be contained when the measurement report is sent to the access network device.

According to a fourth aspect of the embodiments of the present disclosure, an apparatus for configuring an RS set is provided. The apparatus is applicable to an access network device and includes: a receiving module, configured to receive a measurement report, wherein the measurement report is sent by a terminal in response to a channel measurement result meeting a preset condition, the channel measurement result including channel measurement parameters corresponding to n RSs in a target RS set and channel measurement parameters corresponding to m other RSs outside the target RS set, both n and m being positive integers; an updating module, configured to update the target RS set based on the measurement report; and a sending module, configured to send RS set update information to the terminal, wherein the RS set update information is intended to indicate RSs in the updated target RS set.

Optionally, the target RS set is a set of RSs configured to detect a beam failure or a radio link failure, or the target RS set is a set of RSs configured to determine a candidate beam during a beam failure recovery.

Optionally, the measurement report includes identification information of k RSs and indication information of the channel measurement parameters corresponding to the k RSs, k being an integer greater than 1; wherein the k RSs include the n RSs and at least one other RS, with the channel measurement parameter being greater than the channel measurement parameter corresponding to a target RS, in the m other RSs, the target RS being an RS with a minimum channel measurement parameter in the n RSs.

Optionally, the updating module is configured to add at least one RS to the target RS set, and/or to delete at least one RS from the target RS set; wherein the channel measurement parameter corresponding to the RS added to the target RS set is greater than the channel measurement parameter corresponding to the RS deleted from the target RS set.

Optionally, the sending module is further configured to send configuration information to the terminal, wherein the configuration information includes at least one of: measurement object configuration information, measurement parameter configuration information, report trigger configuration information, and report content configuration information; wherein the measurement object configuration information is intended to indicate an RS that needs to acquire the channel measurement parameter, the measurement parameter configuration information is intended to indicate a type of the channel measurement parameter, the report trigger configuration information is intended to indicate the preset condition that needs to be met when the measurement report is sent to the access network device, and the report content configuration information is intended to indicate content that needs to be contained when the measurement report is sent to the access network device.

According to a fifth aspect of the embodiments of the present disclosure, a terminal is provided. The terminal includes: a processor; and memory configured to store an instruction executable by the processor.

The processor is configured to: acquire a channel measurement result, wherein the channel measurement result includes channel measurement parameters corresponding to n RSs in a target RS set and channel measurement parameters corresponding to m other RSs than the target RS set, both n and m being positive integers; send a measurement report to an access network device in response to the channel measurement result meeting a preset condition, wherein the measurement report is configured to trigger the access network device to update the target RS set; and receive RS set update information from the access network device, wherein the RS set update information is configured to indicate RSs in the updated target RS set.

According to a sixth aspect of the embodiments of the present disclosure. An access network device is provided. The access network device includes: a processor; and memory configured to store an instruction executable by the processor.

The processor is configured to: receive a measurement report, wherein the measurement report is sent by a terminal in response to a channel measurement result meeting a preset condition, the channel measurement result including channel measurement parameters corresponding to n RSs in a target RS set and channel measurement parameters corresponding to m other RSs outside the target RS set, both n and m being positive integers; update the target RS set based on the measurement report; and send RS set update information to the terminal, wherein the RS set update information is configured to indicate RSs in the updated target RS set.

According to a seventh aspect of the embodiments of the present disclosure, a non-temporary computer-readable storage medium with a computer program stored thereon is provided. The computer program, when loaded and run by a processor, causes the processor to perform the method for configuring the RS set as described in the first aspect or the method for configuring the RS set as described in the second aspect.

The technical solutions according to the embodiments of the present disclosure may include the following beneficial effects.

The channel measurement result is acquired by the terminal, and the measurement report is sent to the access network device when the channel measurement result meets the preset condition, such that the access network device promptly updates the target RS set based on the measurement report. Thus, the access network device is allowed to maintain a target RS set having a large channel measurement parameter for the terminal, which helps to reduce the probability of a beam failure or to improve the success rate of a beam failure recovery.

It should be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute part of this description, illustrate the embodiments consistent with the present disclosure and, together with the description, serve to explain the principles of the present disclosure.

DETAILED DESCRIPTION

Reference is now be made in detail to exemplary embodiments, examples of which are illustrated in the accompanying drawings. The following description refers to the accompanying drawings in which the same numbers in different drawings represent the same or similar elements unless otherwise represented. The embodiments set forth in the following description do not represent all embodiments consistent with the present disclosure. Instead, they are merely examples of apparatuses and methods consistent with aspects related to the present disclosure as recited in the appended claims.

Network architectures and business scenarios described in the embodiments of the present disclosure are intended to more clearly illustrate the technical solutions of the embodiments of the present disclosure, and do not constitute limitations to the technical solutions according to the embodiments of the present disclosure. It is known by those of ordinary skill in the art that with evolution of the network architectures and emergence of new business scenarios, the technical solutions according to the embodiments of the present disclosure are equally applicable to similar technical problems.

Figure 1:
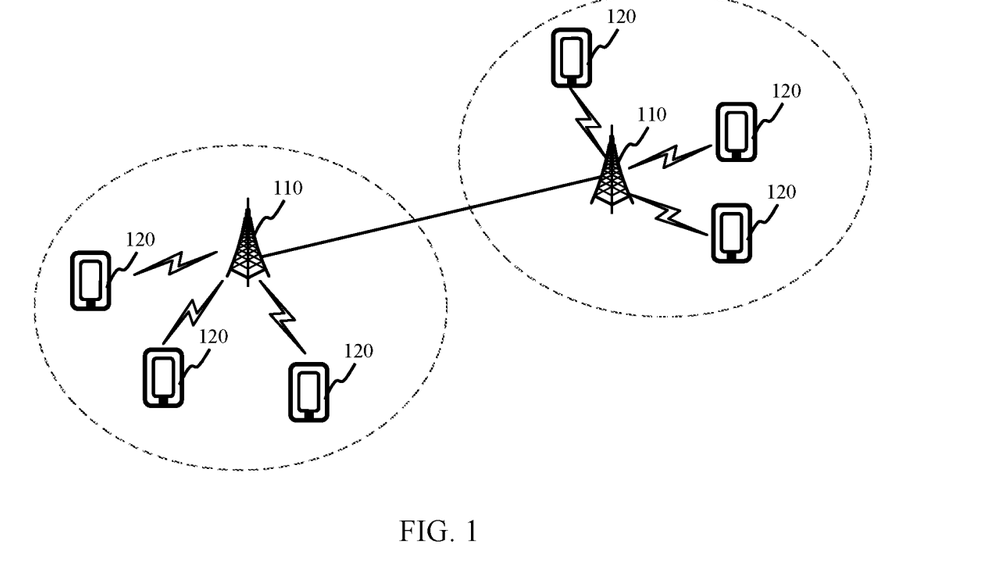
FIG. 1 is a schematic diagram of a network architecture according to an exemplary embodiment.

FIG. 1 is a schematic diagram of a network architecture according to an exemplary embodiment. The network architecture may include an access network device 110 and a terminal 120.

The access network device 110 is deployed in an access network. The access network in a 5G NR system may be called a next generation-radio access network (NG-RAN). The access network device 110 and the terminal 120 communicate with each other by a certain air interface technology, for example, they may communicate with each other by the cellular technology.

The access network device 110 may be a base station (BS), which is an apparatus deployed in an access network to endow a terminal with a radio communication function. The base station may include various forms of macro base stations, micro base stations, relay stations, access points, etc. In systems using different radio access technologies, devices having the functions of the base stations may have different names. For example, in a 5G NR system, these devices are called gNodeBs or gNBs. With evolution of the communication technologies, the name "base station" may change. For ease of description, in the embodiments of the present disclosure, the above-mentioned apparatuses that endow the terminal with the radio communication function are collectively referred to as access network devices.

Usually, there are multiple terminals 120, and one or more terminals 120 may be distributed in a cell managed by each access network device 110. The terminal 120 may include various handheld devices, vehicle-mounted devices, wearable devices and computing devices, having a radio communication function, or other processing devices connected to radio modems, as well as various forms of user equipment (UEs), mobile stations (MSs), terminal devices, or the like. For ease of description, in the embodiments of the present disclosure, the devices mentioned above are collectively referred to as terminals.

The "5G NR system" in the embodiments of the present disclosure may also be referred to as a 5G system or an NR system, but those skilled in the art may understand its meaning. The technical solutions described in the embodiments of the present disclosure may be applicable to the 5G NR system, and may also be applicable to a subsequent evolution system of the 5G NR system.

In the technical solution according to the present disclosure, a channel measurement result is acquired by the terminal, and a measurement report is sent to the access network device when the channel measurement result meets a preset condition, such that the access network device promptly updates a target RS set based on the measurement report. Thus, the access network device is allowed to maintain a target RS set having a large channel measurement parameter for the terminal, which helps to reduce the probability of beam failure or to improve the success rate of beam failure recovery. The technical solution according to the present disclosure will be introduced and explained by several embodiments below.

Figure 2:
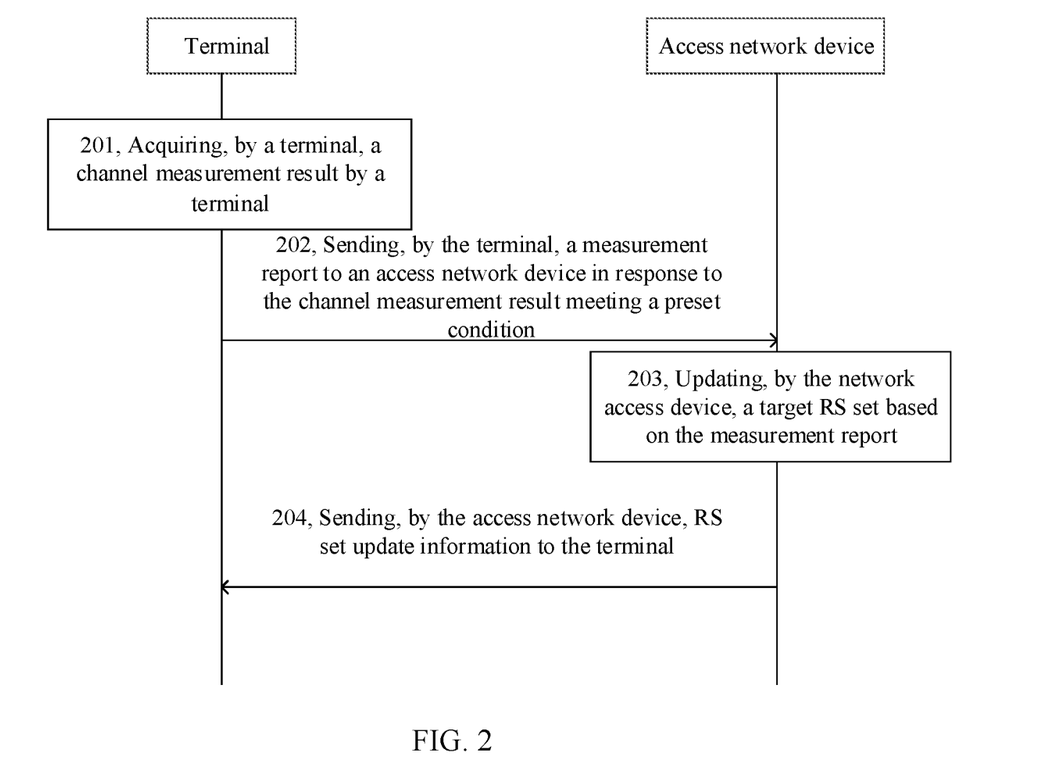
FIG. 2 is a flow chart of a method for configuring an RS set according to an exemplary embodiment.

FIG. 2 is a flow chart of a method for configuring an RS set according to an exemplary embodiment. The method is applicable to the network architecture shown in FIG. 1, and may include the following steps.

In step 201, a terminal acquires a channel measurement result.

In this embodiment, the channel measurement result includes channel measurement parameters corresponding to n RSs in a target RS set and channel measurement parameters corresponding to m other RSs than the target RS set, wherein both n and m are positive integers.

In one example, the target RS set is an RS set configured to detect a beam failure. For a beam transmission scenario, the access network device may configure the terminal with an RS set configured to detect a beam failure. The RS set configured to detect the beam failure includes at least one RS. When the channel measurement parameter corresponding to each RS in the RS set configured to detect the beam failure meets a beam failure decision condition, the terminal determines that a beam failure occurs.

In another example, the target RS set is an RS set configured to detect a radio link failure. The access network device may also configure the terminal with an RS set configured to detect the radio link failure. The RS set configured to detect the radio link failure may include the foregoing RS set configured to detect the beam failure. The RS set configured to detect the radio link failure may also include at least one RS. When the channel measurement parameter corresponding to each RS in the RS set configured to detect the radio link failure meets a radio link failure decision condition, the terminal determines that a radio link failure occurs.

In yet another example, the target RS set is an RS set configured to determine a candidate beam during a beam failure recovery. The access network device may also configure the terminal with the RS set configured to determine the candidate beam. The RS set configured to determine the candidate beam includes at least one RS, and when an RS with a better channel measurement parameter is present in the RS set configured to determine the candidate beam, the terminal finds the candidate beam.

In this embodiment, other RSs are candidate RSs for updating the RSs of the target RS set. Optionally, other RSs may be configured by the access network device and notified to the terminal.

In this embodiment, the channel measurement parameter may include at least one of the followings: channel quality, L1-RSRP, layer-1 reference signal received quality (L1-RSRQ), and layer-1 signal to interference and noise ratio (L1-SINR). When the type of the channel measurement parameter is channel quality or L1-RSRQ or L1-SINR, the terminal needs to measure RSRP and interference corresponding to each RS. It should be noted that RSRP and the interference corresponding to the same RS need to be measured by the same received beam.

It should be noted that the channel measurement parameters corresponding to RSs that the terminal needs to acquire may be configured by the access network device and notified to the terminal. In addition, the types of the channel measurement parameters that the terminal needs to acquire may also be configured by the access network device and notified to the terminal.

Besides, the terminal may periodically or non-periodically acquires the channel measurement result.

In step 202, the terminal sends a measurement report to the access network device when the channel measurement result meets a preset condition.

The preset condition is a condition that is set in advance to trigger the terminal to send the measurement report to the access network device. The preset condition may be configured by the access network device and notified to the terminal.

In this embodiment, the measurement report is configured to trigger the access network device to update the target RS set.

The terminal may send the measurement report to the access network device by a physical uplink control channel (PUCCH) or a physical uplink shared channel (PUSCH).

The measurement report may identification information of k RSs and indication information of channel measurement parameters corresponding to the k RSs, and k is an integer greater than 1. The k RSs include the n RSs and at least one other RS, with the channel measurement parameter being greater than the channel measurement parameter corresponding to a target RS, in the m other RSs, wherein the target RS is an RS with a minimum channel measurement parameter in the n RSs.

The identification information of the RS is also referred to as an RS index for uniquely indicating the RS. Different RSs correspond to different identification information. In this embodiment, the RS may be a non-zero power channel state information reference signal (NZP CSI-RS), or a synchronization signal block (SSB).

Optionally, the preset condition includes any one of:
1. The first W RSs of all the RSs included in the channel measurement result, ranked based on the channel measurement parameters in a descending order, are different from the channel measurement results previously acquired channel, w being a positive integer.

The channel measurement result acquired by the terminal in step 201 may be referred to as the channel measurement result acquired this time. The previously acquired channel measurement result is the channel measurement result acquired before this time. In addition, the value of w may be set in advance, for example, it may be configured by the access network device, which is not limited in the embodiments of the present disclosure.

For example, the target RS set includes RS #1, RS #2, and RS #3, and other RSs include RS #4 and RS #5. In the previously acquired channel measurement result, the RSs are ranked as below based on the channel measurement parameters in a descending order: RS #1, RS #2, RS #3, RS #4, and RS #5. In the channel measurement result acquired this time, the RSs are ranked as below based on the channel measurement parameters in a descending order: RS #4, RS #1, RS #2, RS #3, and RS #5. Assuming that w is 3, since the front 3 RSs have changed in the two ranking results before and after, the forgoing preset condition is met. At this time, the terminal may send a measurement report to the access network device, and the measurement report may include indication information of the channel measurement parameters corresponding to all the RSs (i.e., RS #1, RS #2 and RS #3) in the target RS set, and may also include indication information of the channel measurement parameter corresponding to RS #4.

When the channel measurement result meets the preset condition, it means that the order of the RSs with larger channel measurement parameters has changed. At this time, the terminal sends a measurement report to the access network device, such that the access network device may update the target RS set based on the measurement report, e.g., add an RS with a larger channel measurement parameter to the target RS set, and delete an RS with a smaller channel measurement parameter from the target RS set.

2. The channel measurement parameter corresponding to at least one RS in the target RS set is less than a first threshold value.

The first threshold value may be set in advance, e.g., it may be configured by the access network device or predesignated by a protocol, which is not limited in the embodiments of the present disclosure.

For example, the target RS set includes RS #1, RS #2, and RS #3, and the type of the channel measurement parameter is L1-RSRP. It is assumed that L1-RSRP corresponding to RS #1 is less than the first threshold value, and L1-RSRP corresponding to RS #2 and RS #3 is not less than the first threshold value. In this case, the channel measurement result meets the aforementioned preset condition. At this time, the terminal may send a measurement report to the access network device, and the measurement report may include indication information of L1-RSRP corresponding to all the RSs (i.e., RS #1, RS #2 and RS #3) in the target RS set.

When the channel measurement result meets the preset condition, it means that an RS with a smaller channel measurement parameter exists in the target RS set. At this time, the terminal sends a measurement report to the access network device, such that the access network device may update the target RS set based on the measurement report, e.g., delete an RS with a smaller channel measurement parameter from the target RS set.

3. A sum of the channel measurement parameter corresponding to at least one RS in the target RS set and a preset offset is less than a maximum value of the channel measurement parameters corresponding to the m other RSs.

The preset offset may be set in advance, e.g., it may be configured by the access network device or predesignated by a protocol, which is not limited in the embodiments of the present disclosure. Optionally, the preset offset is greater than 0.

For example, the target RS set includes RS #1, RS #2 and RS #3, other RSs include RS #4 and RS #5, and the type of the channel measurement parameter is L1-RSRP. It is assumed that the maximum value of the L1-RSRP corresponding to other RSs is L1-RSRP corresponding to RS #5, and the sum of L1-RSRP corresponding to RS #2 and the preset offset is less than L1-RSRP corresponding to RS #5. Thus, the preset condition is met. At this time, the terminal may send a measurement report to the access network device, and the measurement report may include the indication information of L1-RSRP corresponding to the RSs (i.e., RS #1, RS #2, and RS #3) in the target RS set, and may also include indication information of L1-RSRP corresponding to RS #5.

When the channel measurement result meets the preset condition, it means that an RS with a smaller channel measurement parameter exists in the target RS set and other RSs with larger channel measurement parameters also exist in the target RS set. At this time, the terminal sends a measurement report to the access network device, such that the access network device may update the target RS set based on the measurement report, e.g., add other RSs with larger channel measurement parameters to the target RS set and delete an RS with a smaller channel measurement parameter from the target RS set.

4. The channel measurement parameter corresponding to at least one other RS in the m other RSs is greater than a second threshold value.

The second threshold value may be set in advance, e.g., it may be configured by the access network device or predesignated by a protocol, which is not limited in the embodiments of the present disclosure.

For example, other RSs include RS #4 and RS #5, and the type of the channel measurement parameter is L1-RSRP. It is assumed that L1-RSRP corresponding to RS #4 is greater than the second threshold value, and L1-RSRP corresponding to RS #5 is not greater than the second threshold value. In this case, the channel measurement result meets the preset condition. At this time, the terminal may send a measurement report to the access network device, and the measurement report may include indication information of L1-RSRP corresponding to all the RSs in the target RS set and indication information of L1-RSRP corresponding to RS #4.

When the channel measurement result meets the preset condition, it means that there are other RSs with larger channel measurement parameters. At this time, the terminal sends a measurement report to the access network device, such that the access network device may update the target RS set based on the measurement report, e.g., add other RSs with larger channel measurement parameters to the target RS set.

5. The channel measurement parameter corresponding to at least one RS in the target RS set is less than a third threshold value, and the channel measurement parameter corresponding to at least one other RS in the m other RSs is greater than a fourth threshold value.

The third threshold value and the fourth threshold value may be set in advance, e.g., they may be configured by the access network device or predesignated by a protocol, which is not limited in the embodiments of the present disclosure.

For example, the target RS set includes RS #1, RS #2 and RS #3, other RSs include RS #4 and RS #5, and the type of the channel measurement parameter is L1-RSRP. It is assumed that L1-RSRP corresponding to RS #2 is less than the third threshold value, and L1-RSRP corresponding to RS #5 is greater than the fourth threshold value. Thus, the preset condition is met. At this time, the terminal may send a measurement report to the access network device, and the measurement report may include the indication information of L1-RSRP corresponding to the RSs (i.e., RS #1, RS #2, and RS #3) in the target RS set, and may also include indication information of L1-RSRP corresponding to RS #5.

When the channel measurement result meets the preset condition, it means that an RS with a smaller channel measurement parameter exists in the target RS set and other RSs with larger channel measurement parameters also exist in the target RS set. At this time, the terminal sends a measurement report to the access network device, such that the access network device may update the target RS set based on the measurement report, e.g., add other RSs with larger channel measurement parameters to the target RS set and delete an RS with a smaller channel measurement parameter from the target RS set.

In this embodiment, the indication information of the channel measurement parameter corresponding to the RS may be configured to indicate a magnitude of the channel measurement parameter. In one example, the indication information of the channel measurement parameters corresponding to the k RSs in the measurement report may be expressed as follows: in the k RSs, the indication information of the channel measurement parameter corresponding to an optimal RS is represented by a bits, wherein the optimal RS is an RS with a maximum channel measurement parameter in the k RSs, and a is a positive integer; and in the k RSs, the indication information of the channel measurement parameter corresponding to each remaining RS other than the optimal RS is represented by b bits, wherein b is a positive integer. Optionally, the a bits are configured to represent an absolute value of the channel measurement parameter corresponding to the optimal RS. In addition, the indication information of the channel measurement parameter corresponding to an $i^{th}$ remaining RS is configured to indicate a difference between the channel measurement parameter corresponding to the $i^{th}$ remaining RS and the channel measurement parameter corresponding to the optimal RS, wherein i is a positive integer. The values of a and b may be set according to the type of the channel measurement parameter and a corresponding value range. For example, when the channel measurement parameter is L1-RSRP, a=7 and b=4.

Optionally, in various different sequences formed by the b bits, a designated sequence is selected to indicate that the channel measurement parameter corresponding to the RS is less than a preset threshold. For example, when b=4, 16 different sequences may be formed, and it is assumed that "0000" is selected to indicate that the channel measurement parameter corresponding to the RS is less than the preset threshold. When the channel measurement parameter corresponding to a certain RS is less than the preset threshold, it means that a beam failure occurs to a beam corresponding to the RS. The preset threshold may be set according to the type of the channel measurement parameter. For example, when the channel measurement parameter is L1-RSRP, the preset threshold is set to −140 db. In this way, when the access network device finds from the measurement report that the indication information of the channel measurement parameter corresponding to a certain RS is represented by a specified sequence, it can be known that a beam failure occurs to the beam corresponding to the RS. Subsequently, the access network device may delete the RS from the target RS set.

Optionally, the measurement report further includes parameter type indication information. If various different types of channel measurement parameters are available for the terminal to choose, the terminal may add the parameter type indication information to the measurement report to indicate the type of the channel measurement parameter.

In step 203, the access network device updates the target RS set based on the measurement report.

In an example, the access network device adds at least one RS to the target RS set, and/or deletes at least one RS from the target RS set. The channel measurement parameter corresponding to the RS added to the target RS set is greater than the channel measurement parameter corresponding to the RS deleted from the target RS set.

Exemplarily, it is assumed that the measurement report received by the access network device includes the indication information of the channel measurement parameters corresponding to all the RSs (e.g., RS #1, RS #2 and RS #3) included in the target RS set, and the indication information of the channel measurement parameter corresponding to at least one other RS (e.g., RS #4). If the access network device determines based on the aforementioned information that the channel measurement parameter corresponding to RS #4 is greater than the channel measurement parameter corresponding to RS #2, the access network device may delete RS #2 from the target RS set and add RS #4 to the target RS set.

In step 204, the access network device sends RS set update information to the terminal.

The RS set update information is configured to indicate RSs in the updated target RS set.

In one example, the RS set update information includes identification information of each RS in the updated target RS set.

In another example, the RS set update information includes addition indication information and/or deletion indication information. The addition indication information is configured to indicate the RS that needs to be added to the target RS set, and the deletion indication information is configured to indicate the RS that needs to be deleted from the target RS set.

Optionally, the access network device sends the RS set update information to the terminal by means of RRC signaling. Correspondingly, the terminal receives the RS set update information from the access network device, and updates the target RS set based on the RS set update information.

Optionally, the access network device sends configuration information to the terminal. The configuration information may include at least one of the followings: measurement object configuration information, measurement parameter configuration information, report trigger configuration information, and report content configuration information. The measurement object configuration information is configured to indicate an RS that needs to acquire a channel measurement parameter. For example, the measurement object configuration information may include identification information of all the RSs in the target RS set and identification information of the other RSs described above. The measurement parameter configuration information is configured to indicate the type of the channel measurement parameter, e.g., to notify the terminal which channel measurement parameter of the channel quality, L1-RSRP, L1-RSRQ and L1-SINR is adopted for measurement. The report trigger configuration information is configured to indicate the preset condition that needs to be met when the measurement report is sent to the access network device. Optionally, the preset condition includes the values of the threshold values or the preset offsets described above. The report content configuration information is configured to indicate content that needs to be contained when the measurement report is sent to the access network device, e.g., to notify the terminal that the measurement report needs to include the identification information of the RSs and the indication information of the channel measurement parameters. Correspondingly, the terminal receives the configuration information from the access network device, and performs measurement and reporting based on the configuration information.

In summary, in the technical solution according to this embodiment, the channel measurement result is acquired by the terminal, and the measurement report is sent to the access network device when the channel measurement result meets the preset condition, such that the access network device promptly updates the target RS set based on the measurement report. Thus, the access network device is allowed to maintain a target RS set having a large channel measurement parameter for the terminal, which helps to reduce the probability of a beam failure or to improve the success rate of a beam failure recovery.

In addition, the terminal does not send the measurement report to the access network device until upon detecting that the channel measurement result meets the preset condition. Compared with the solution that the terminal sends the measurement report to the access network device periodically, non-periodically or semi-statically, the technical solution according to this embodiment has the advantages that the terminal only sends the measurement report to the access network device when necessary, avoiding unnecessary sending of a measurement report, which helps to reduce the signaling overhead of the terminal.

The above-mentioned method embodiments are merely described in terms of interaction between the access network device and the terminal. The steps related to the access network device may be implemented separately as the method for configuring the RS set on the access network device side, and the steps related to the terminal may be separately implemented as the method for configuring the RS set on the terminal side.

Described hereinafter are apparatus embodiments of the present disclosure, which may be used to execute the method embodiments of the present disclosure. For details that are not disclosed in the apparatus embodiments of the present disclosure, reference may be made to the method embodiments of the present disclosure.

Figure 3:
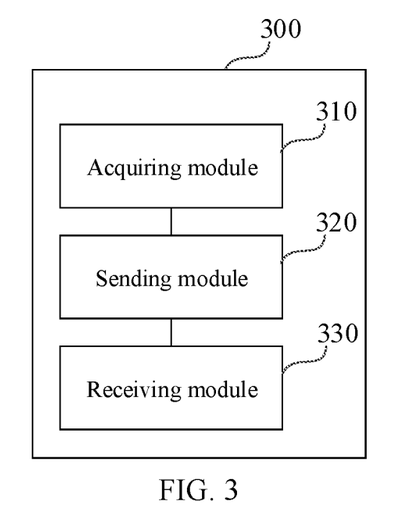
FIG. 3 is a block diagram of an apparatus for configuring an RS set according to one exemplary embodiment.

FIG. 3 is a block diagram of an apparatus for configuring an RS set according to an exemplary embodiment. The apparatus has the function of implementing the above method example on the terminal side described above. The function may be implemented by hardware or implemented by executing corresponding software by hardware. The apparatus may be the terminal described above, or may be disposed in the terminal. The apparatus 400 may include an acquiring module 310, a sending module 320 and a receiving module 330.

The acquiring module 310 is configured to acquire a channel measurement result, wherein the channel measurement result includes channel measurement parameters corresponding to n RSs in a target RS set and channel measurement parameters corresponding to m other RSs outside the target RS set, both n and m being positive integers.

The sending module 320 is configured to send a measurement report to an access network device in response to the channel measurement result meeting a preset condition, wherein the measurement report is configured to trigger the access network device to update the target RS set.

The receiving module 330 is configured to receive RS set update information from the access network device, wherein the RS set update information is configured to indicate RSs in the updated target RS set.

In summary, in the technical solution according to this embodiment, the channel measurement result is acquired by the terminal, and the measurement report is sent to the access network device when the channel measurement result meets the preset condition, such that the access network device promptly updates the target RS set based on the measurement report. Thus, the access network device is allowed to maintain a target RS set having a large channel measurement parameter for the terminal, which helps to reduce the probability of a beam failure or to improve the success rate of a beam failure recovery.

In one optional embodiment based on the embodiment shown in FIG. 3, the target RS set is an RS set configured to detect a beam failure or a radio link failure, or the target RS set is an RS set configured to determine a candidate beam during a beam failure recovery.

In another optional embodiment based on the embodiment shown in FIG. 3 or any one of the above-mentioned optional embodiments, the measurement report includes identification information of k RSs and indication information of the channel measurement parameters corresponding to the k RSs, wherein k is an integer greater than 1; wherein the k RSs include the n RSs and at least one other RS, with the channel measurement parameter being greater than the channel measurement parameter corresponding to a target RS, in the m other RSs, wherein the target RS is an RS with a minimum channel measurement parameter in the n RSs.

In the k RSs, the indication information of the channel measurement parameter corresponding to an optimal RS is represented by a bits, wherein the optimal RS is an RS with a maximum channel measurement parameter in the k RSs, and a is a positive integer.

In the k RSs, the indication information of the channel measurement parameter corresponding to each remaining RS other than the optimal RS is represented by b bits, wherein b is a positive integer.

The indication information of the channel measurement parameter corresponding to an $i^{th}$ remaining RS is configured to indicate a difference between the channel measurement parameter corresponding to the $i^{th}$ remaining RS and the channel measurement parameter corresponding to the optimal RS, or to indicate that the channel measurement parameter corresponding to the $i^{th}$ remaining RS is less than a present threshold, wherein i is a positive integer.

In yet another optional embodiment based on the embodiment shown in FIG. 3 or any one of the above-mentioned optional embodiments, the preset condition includes any one of: the first W RSs of all the RSs included in the channel measurement result, ranked based on the channel measurement parameters in a descending order, being different from the channel measurement results previously acquired channel, w being a positive integer; or the channel measurement parameter corresponding to at least one RS in the target RS set being less than a first threshold value; or a sum of the channel measurement parameter corresponding to at least one RS in the target RS set and a preset offset being less than a maximum value of the channel measurement parameters corresponding to the m other RSs; or the channel measurement parameter corresponding to at least one other RS in the m other RSs being greater than a second threshold value; or the channel measurement parameter corresponding to at least one RS in the target RS set being less than a third threshold value, and the channel measurement parameter corresponding to at least one other RS in the m other RSs being greater than a fourth threshold value.

In still another optional embodiment based on the embodiment shown in FIG. 3 or any one of the above-mentioned optional embodiments, the receiving module 330 is further configured to receive configuration information from the access network device. The configuration information includes at least one of: measurement object configuration information, measurement parameter configuration information, report trigger configuration information, and report content configuration information.

The measurement object configuration information is configured to indicate an RS that needs to acquire the channel measurement parameter, the measurement parameter configuration information is configured to indicate a type of the channel measurement parameter, the report trigger configuration information is configured to indicate the preset condition that needs to be met when the measurement report is sent to the access network device, and the report content configuration information is configured to indicate content that needs to be contained when the measurement report is sent to the access network device.

Figure 4:
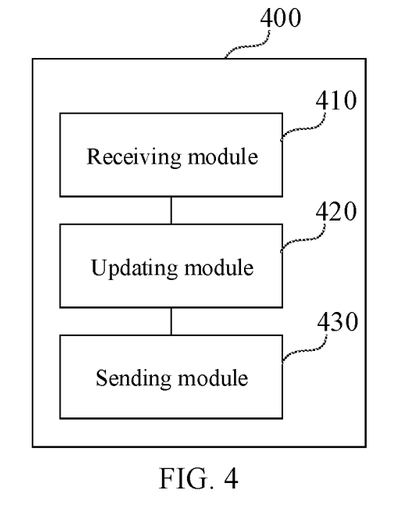
FIG. 4 is a block diagram of an apparatus for configuring an RS set according to another exemplary embodiment.

FIG. 4 is a block diagram of an apparatus for configuring an RS set according to another exemplary embodiment. The apparatus has the function of implementing the above method example on the access network device side described above. The function may be implemented by hardware or implemented by executing corresponding software by hardware. The apparatus may be the access network device described above, or may be disposed in the access network device. The apparatus 400 may include a receiving module 410, an updating module 420 and a sending module 430.

The receiving module 410 is configured to receive a measurement report, wherein the measurement report is sent by a terminal in response to a channel measurement result meeting a preset condition, the channel measurement result including channel measurement parameters corresponding to n RSs in a target RS set and channel measurement parameters corresponding to m other RSs outside the target RS set, both n and m being positive integers.

The updating module 420 is configured to update the target RS set based on the measurement report.

The sending module 430 is configured to send RS set update information to the terminal, wherein the RS set update information is configured to indicate RSs in the updated target RS set.

In summary, in the technical solution according to this embodiment, the channel measurement result is acquired by the terminal, and the measurement report is sent to the access network device when the channel measurement result meets the preset condition, such that the access network device promptly updates the target RS set based on the measurement report. Thus, the access network device is allowed to maintain a target RS set having a large channel measurement parameter for the terminal, which helps to reduce the probability of a beam failure or to improve the success rate of a beam failure recovery.

In one optional embodiment based on the embodiment shown in FIG. 4, the target RS set is an RS set configured to detect a beam failure or a radio link failure, or the target RS set is an RS set configured to determine a candidate beam during a beam failure recovery In another optional embodiment based on the embodiment shown in FIG. 4 or any one of the above-mentioned optional embodiments, the measurement report includes identification information of k RSs and indication information of channel measurement parameters corresponding to the k RSs, wherein k is an integer greater than 1; wherein the k RSs include the n RSs and at least one other RS, with the channel measurement parameter being greater than the channel measurement parameter corresponding to a target RS, in the m other RSs, the target RS being an RS with a minimum channel measurement parameter in then RSs.

Optionally, the updating module 420 is configured to add at least one RS to the target RS set, and/or to delete at least one RS from the target RS set; wherein the channel measurement parameter corresponding to the RS added to the target RS set is greater than the channel measurement parameter corresponding to the RS deleted from the target RS set.

In yet another optional embodiment based on the embodiment shown in FIG. 4 or any one of the above-mentioned optional embodiments, the sending module 430 is further configured to send configuration information to the terminal, wherein the configuration information includes at least one of the followings: measurement object configuration information, measurement parameter configuration information, report trigger configuration information and report content configuration information; wherein the measurement object configuration information is configured to indicate an RS that needs to acquire the channel measurement parameter, the measurement parameter configuration information is configured to indicate the type of the channel measurement parameter, the report trigger configuration information is configured to indicate the preset condition that needs to be met when the measurement report is sent to the access network device, and the report content configuration information is configured to indicate content that needs to be contained when the measurement report is sent to the access network device.

It should be noted that the apparatus according to the above embodiment only takes division of all the functional modules as an example for explanation during implementation of its functions. In practice, the above functions can be finished by the different functional modules as required. That is, the internal structure of the device is divided into different functional modules to finish all or part of the functions described above.

With regard to the apparatus in the aforesaid embodiments, the details about how the respective modules perform the operations have been described in detail in the embodiments of the method, which are not described herein any further.

The solution according to the embodiment of the present disclosure is mainly described in terms of interaction between the access network device and the terminal. It may be understood that for implementing the above functions, the network access device and the terminal include corresponding hardware structures and/or software modules for executing various functions. Various exemplary modules and algorithm steps described in conjunction with the embodiments disclosed in the present disclosure may be implemented as hardware or a combination of hardware and computer software. Whether some functions are implemented in the manner of hardware or in the manner that computer software drives the hardware depends on particular applications and design constraints of the technical solutions. A person skilled in the art may implement the described functions with different methods for each of particular applications, but such implementation shall not be regarded as going beyond the scope of the technical solution of the embodiment of the present disclosure.

Figure 5:
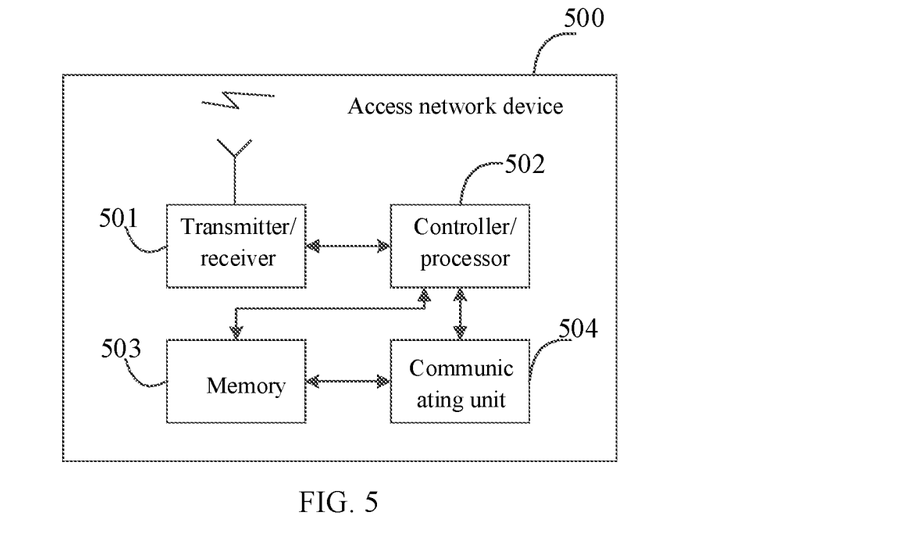
FIG. 5 is a schematic structural diagram of an access network device according to an exemplary embodiment.

FIG. 5 is a schematic structural diagram of a network access device according to an exemplary embodiment.

An access network device 500 includes a transmitter/receiver 501 and a processor 502. The processor 502 may also be a controller and is shown as a "controller/processor 502" in FIG. 5. The transmitter/receiver 501 is configured to support sending and receiving of information between the network access device and the terminal in the foregoing embodiment and also to support communication between the access network device and other network entities. The processor 502 executes various functions for communicating with the terminal. On an uplink, an uplink signal from the terminal is received by an antenna, demodulated (e.g., a high-frequency signal is demodulated to be a baseband signal) by the receiver 501 and further processed by the processor 502 to restore business data and signaling messages sent by the terminal. On a downlink, the business data and the signaling messages are processed by the processor 502 and modulated (e.g., a baseband signal is modulated to be a high-frequency signal) by the transmitter 501 to produce a downlink signal, and the downlink signal is transmitted to the terminal by the antenna. It should be noted that the foregoing modulating or demodulating function may also be finished by the processor 502. For example, the processor 502 is further configured to implement all the steps on the access network device side in the above method embodiments, and/or other steps in the technical solutions described in the embodiments of the present disclosure.

Further, the access network device 500 may also include memory 503, and the memory 503 is configured to store program codes and data of the access network device 500. In addition, the access network device 500 may further include a communication unit 504. The communication unit 504 is configured to support communication between the access network device 500 and other network entities (e.g., network devices in a core network). For example, in a 5G NR system, the communication unit 504 may be an NG-U interface for supporting communication between the access network device 500 and user plane function (UPF) entities; or the communication unit 504 may also be an NG-C interface for supporting communication between the access network device 500 and access and mobility management function (AMF) entities.

It may be understood that FIG. 5 only shows a simplified design of the access network device 500. In practice, the access network device 500 may include any number of transmitters, receivers, processors, controllers, memories, communication units and the like, and all network access devices that may implement the embodiments of the present disclosure are within the scope of protection of the embodiments of the present disclosure.

Figure 6:
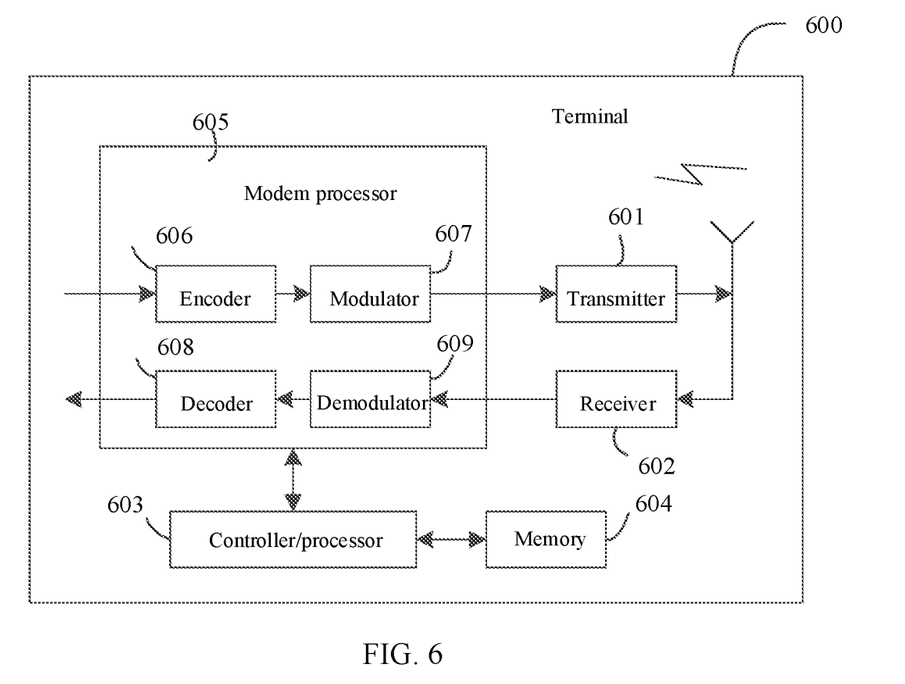
FIG. 6 is a schematic structural diagram of a terminal according to an exemplary embodiment.

FIG. 6 is a schematic structural diagram of a terminal according to an exemplary embodiment.

The terminal 600 includes a transmitter 601, a receiver 602, and a processor 603. The processor may also be a controller and is shown as "controller/processor 603" in FIG. 6. Optionally, the terminal 600 may further include a modem processor 605, and the modem processor 605 may include an encoder 606, a modulator 607, a decoder 608, and a demodulator 609.

In one example, the transmitter 601 adjusts (e.g., analog converts, filters, amplifies, up-converts, or the like) an output sample and generates an uplink signal. The uplink signal is transmitted to the access network device as described in the foregoing embodiment via an antenna. On a downlink, the antenna receives a downlink signal from the access network device as described in the foregoing embodiment. The receiver 602 adjusts (e.g., filters, amplifies, downconverts, digitizers, or the like) the signal received from the antenna and provides an input sample. In the modem processor 605, the encoder 606 receives business data and signaling messages to be transmitted on an uplink, and processes (e.g., formats, encodes and interleaves) the business data and the signaling messages. The modulator 607 further processes (e.g., symbol maps and modulates) the encoded business data and signaling messages and provides an output sample. The demodulator 609 processes (e.g., demodulates) the input sample and provides a symbol estimate. The decoder 608 processes (e.g., de-interleaves and decodes) the symbol estimate and provides the decoded data and signaling messages sent to the terminal 600. The encoder 606, the modulator 607, the demodulator 609, and the decoder 608 may be implemented by the synthesized modem processor 605. These units perform processing according to radio access technologies (e.g., access technologies of LTE and other evolution systems) adopted by a radio access network. It should be noted that when the terminal 600 does not include the modem processor 605, the foregoing functions of the modem processor 605 may also be performed by the processor 603.

The processor 603 controls and manages actions of the terminal 600, and is configured to execute the processing procedure performed by the terminal 600 in the above-mentioned embodiments of the present disclosure. For example, the processor 603 is further configured to execute all the steps on the terminal side in the above-mentioned method embodiments, and/or other steps of the technical solutions described in the embodiments of the present disclosure.

Further, the terminal 600 may include memory 604 for storing program codes and data of the terminal 600.

It may be understood that FIG. 6 only shows a simplified design of the terminal 600. In practice, the terminal 600 may include any number of transmitters, receivers, processors, modem processors, memories and the like, and all terminals that may implement the embodiments of the present disclosure are within the scope of protection of the embodiments of the present disclosure.

An embodiment of the present disclosure further provides a non-temporary computer-readable storage medium with a computer program stored thereon. The computer program, when loaded and run by a processor of an access network device, causes the access network device to perform the method for configuring the RS set on the access network device side as described above.

An embodiment of the present disclosure further provides a non-temporary computer-readable storage medium with a computer program stored thereon. The computer program, when loaded and run by a processor of a terminal, causes the terminal to perform the method for configuring the RS set on the terminal side as described above.

It is to be understood that the term "a plurality of" herein refers to two or more; and the term "and/or" herein describes an association relationship between associated objects, indicating three relationships. For example, A and/or B, can be expressed as: A exists alone, A and B exist concurrently, B exists alone. The symbol "/" generally indicates an "OR" relationship between contextual objects.

Other embodiments of the present disclosure will be apparent to those skilled in the art upon consideration of the description and practice of the present disclosure disclosed herein. The present application is intended to cover any variations, uses, or adaptations of the present disclosure following general principles of the present disclosure and including the common sense or conventional technical means in the art that is not disclosed by the present disclosure. The description and the embodiments are considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be subject to the appended claims.

What is claimed is:

1. A method for configuring a reference signal (RS) set, comprising:
    acquiring, by a terminal, a channel measurement result, wherein the channel measurement result comprises channel measurement parameters corresponding to n RSs in a target RS set and channel measurement parameters corresponding to m other RSs outside the target RS set, both n and m being positive integers, wherein the target RS set is a set of RSs configured to detect a beam failure, and the m other RSs are candidate RSs for updating RSs in the target RS set;
    sending, by the terminal, a measurement report to an access network device in response to the channel measurement result meeting a preset condition, wherein the measurement report is configured to trigger the access network device to update the target RS set; and
    receiving, by the terminal, RS set update information from the access network device, wherein the RS set update information is configured to indicate RSs in the updated target RS set,
    wherein the preset condition comprises:
    the channel measurement parameter corresponding to at least one RS in the target RS set being less than the first threshold value, and the channel measurement parameter corresponding to at least one RS in the m other RSs being greater than a second threshold value,
    the method further comprising:
    receiving, by the terminal, configuration information from the access network device, wherein the configuration information comprises measurement object configuration information and report content configuration information.

2. The method according to claim 1, wherein the measurement report comprises identification information of k RSs and indication information of the channel measurement parameters corresponding to the k RSs, k being an integer greater than 1;
    wherein the k RSs comprise the n RSs and at least one RS, with the channel measurement parameter being greater than the channel measurement parameter corresponding to a target RS, in the m other RSs, the target RS being an RS with a minimum channel measurement parameter in the n RSs.

3. The method according to claim 2, wherein
    in the k RSs, the indication information of the channel measurement parameter corresponding to an optimal RS is represented by a number of a bits, the optimal RS being an RS with a maximum channel measurement parameter in the k RSs, a being a positive integer;
    in the k RSs, the indication information of the channel measurement parameter corresponding to each remaining RS other than the optimal RS is represented by b bits, b being a positive integer; and
    the indication information of the channel measurement parameter corresponding to an $i^{th}$ remaining RS is configured to indicate a difference between the channel measurement parameter corresponding to the $i^{th}$ remaining RS and the channel measurement parameter corresponding to the optimal RS, or to indicate that the channel measurement parameter corresponding to the $i^{th}$ remaining RS is less than a present threshold, i being a positive integer.

4. The method according to claim 1, wherein the preset condition comprises:
the first W RSs of all the RSs included in the channel measurement result, ranked based on the channel measurement parameters in a descending order being different from the channel measurement results previously acquired, w being a positive integer; or
a sum of the channel measurement parameter corresponding to at least one RS in the target RS set and a preset offset being less than a maximum value of the channel measurement parameters corresponding to the m other RSs.

5. The method according to claim 1,
wherein the measurement object configuration information is configured to indicate an RS that needs to acquire the channel measurement parameter, and the report content configuration information is configured to indicate content that needs to be contained when the measurement report is sent to the access network device.

6. A method for configuring a reference signal (RS) set, comprising:
receiving, by an access network device, a measurement report, wherein the measurement report is sent by a terminal in response to a channel measurement result meeting a preset condition, the channel measurement result comprising channel measurement parameters corresponding to n RSs in a target RS set and channel measurement parameters corresponding to m other RSs outside the target RS set, both n and m being positive integers, wherein the target RS set is a set of RSs configured to detect a beam failure, and the m other RSs are candidate RSs for updating RSs in the target RS set;
updating, by the access network device, the target RS set based on the measurement report; and
sending, by the access network device, RS set update information to the terminal, wherein the RS set update information is configured to indicate RSs in the updated target RS set,
wherein the preset condition comprises the channel measurement parameter corresponding to at least one RS in the target RS set being less than the first threshold value, and the channel measurement parameter corresponding to at least one RS in the m other RSs being greater than a second threshold value,
the method further comprising:
sending, by the access network device, configuration information to the terminal, wherein the configuration information comprises measurement object configuration information and report content configuration information.

7. The method according to claim 6, wherein the measurement report comprises identification information of k RSs and indication information of the channel measurement parameters corresponding to the k RSs, k being an integer greater than 1;
wherein the k RSs comprise the n RSs and at least one RS, with the channel measurement parameter being greater than the channel measurement parameter corresponding to a target RS, in the m other RSs, the target RS being an RS with a minimum channel measurement parameter in the n RSs.

8. The method according to claim 7, wherein said updating, by the access network device, the target RS set based on the measurement report comprises:
adding, by the access network device, at least one RS of the m other RSs to the target RS set, and/or deleting at least one RS from the target RS set;
wherein the channel measurement parameter corresponding to the RS added to the target RS set is greater than the channel measurement parameter corresponding to the RS deleted from the target RS set.

9. The method according to claim 6,
wherein the measurement object configuration information is configured to indicate an RS that needs to acquire the channel measurement parameter, and the report content configuration information is configured to indicate content that needs to be contained when the measurement report is sent to the access network device.

10. A terminal, comprising:
a processor; and
memory for storing an instruction executable by the processor;
wherein the processor is configured to:
acquire a channel measurement result, wherein the channel measurement result comprises channel measurement parameters corresponding to n RSs in a target RS set and channel measurement parameters corresponding to m other RSs outside the target RS set, both n and m being positive integers, wherein the target RS set is a set of RSs configured to detect a beam failure, and the m other RSs are candidate RSs for updating RSs in the target RS set;
send a measurement report to an access network device in response to the channel measurement result meeting a preset condition, wherein the measurement report is configured to trigger the access network device to update the target RS set; and
receive RS set update information from the access network device, wherein the RS set update information is configured to indicate RSs in the updated target RS set,
wherein the preset condition comprises the channel measurement parameter corresponding to at least one RS in the target RS set being less than the first threshold value, and the channel measurement parameter corresponding to at least one RS in the m other RSs being greater than a second threshold value,
wherein the processor is further configured to:
receive, configuration information from the access network device, wherein the configuration information comprises measurement object configuration information and report content configuration information.

11. The terminal of claim 10, wherein the target RS set is a set of RSs configured to detect a radio link failure.

12. The terminal according to claim 10, wherein the measurement report comprises identification information of k RSs and indication information of the channel measurement parameters corresponding to the k RSs, k being an integer greater than 1;
wherein the k RSs comprise the n RSs and at least one RS, with the channel measurement parameter being greater than the channel measurement parameter corresponding to a target RS, in the m other RSs, the target RS being an RS with a minimum channel measurement parameter in the n RSs.

13. The terminal according to claim 12, wherein
in the k RSs, the indication information of the channel measurement parameter corresponding to an optimal RS is represented by a bit, the optimal RS being an RS with a maximum channel measurement parameter in the k RSs, a being a positive integer;

in the k RSs, the indication information of the channel measurement parameter corresponding to each remaining RS other than the optimal RS is represented by b bits, b being a positive integer; and the indication information of the channel measurement parameter corresponding to an $i^{th}$ remaining RS is configured to indicate a difference between the channel measurement parameter corresponding to the $i^{th}$ remaining RS and the channel measurement parameter corresponding to the optimal RS, or to indicate that the channel measurement parameter corresponding to the $i^{th}$ remaining RS is less than a present threshold, i being a positive integer.

14. The terminal according to claim 10, wherein the preset condition comprises:

the first W RSs of all the RSs included in the channel measurement result, ranked based on the channel measurement parameters in a descending order, being different from the channel measurement results previously acquired, w being a positive integer; or a sum of the channel measurement parameter corresponding to at least one RS in the target RS set and a preset offset being less than a maximum value of the channel measurement parameters corresponding to the m other RSs.

15. The terminal according to claim 10, wherein the measurement object configuration information is configured to indicate an RS that needs to acquire the channel measurement parameter, and the report content configuration information is configured to indicate content that needs to be contained when the measurement report is sent to the access network device.

16. The terminal according to claim 15, wherein the terminal is configured to send the measurement report to the access network so as to facilitate the access network device timely updating the target RS set based on the measurement report and maintaining a target RS set having an improved channel measurement parameter, thereby reducing a probability of a beam failure or improving a success rate of a beam failure recovery.

17. An access network device implementing the method of claim 6, comprising:

a processor; and memory for storing an instruction executable by the processor;

wherein the processor is configured to perform steps of the method.

18. A non-transitory computer-readable storage medium with a computer program stored thereon, wherein the computer program, when loaded and run by a processor, causes the processor to perform steps of the method according to claim 1.

* * * * *